United States Patent [19]
Djerf et al.

[11] Patent Number: 5,660,282
[45] Date of Patent: *Aug. 26, 1997

[54] METHOD AND APPARATUS FOR SEPARATING RESOURCE MATERIALS FROM SOLID WASTE

[75] Inventors: Tobin Djerf; Gwen Damico, both of Tyler, Tex.

[73] Assignee: Evergreen Global Resources, Inc., Tyler, Tex.

[*] Notice: The term of this patent shall not extend beyond the expiration date of Pat. No. 5,341,935.

[21] Appl. No.: 297,978

[22] Filed: Aug. 30, 1994

Related U.S. Application Data

[63] Continuation-in-part of Ser. No. 61,285, Apr. 29, 1993, Pat. No. 5,341,935.

[51] Int. Cl.$^6$ ........................................... B07B 13/00
[52] U.S. Cl. ........................... 209/11; 209/20; 209/46; 209/692
[58] Field of Search ................... 209/3, 3.1, 11, 209/20, 45, 46, 700, 691, 692, 694, 466, 502, 471, 486, 930

[56] References Cited

U.S. PATENT DOCUMENTS

| | | | |
|---|---|---|---|
| 1,141,852 | 6/1915 | Sutton et al. | 209/691 X |
| 3,105,040 | 9/1963 | Wood | 209/20 |
| 3,114,703 | 12/1963 | Brison | 209/46 X |
| 3,446,355 | 5/1969 | Boucraut et al. | 209/20 X |
| 3,599,788 | 8/1971 | Fyfe et al. | 209/11 |
| 4,264,352 | 4/1981 | Houser | 209/11 X |
| 4,606,739 | 8/1986 | Brannstrom | 209/20 X |
| 4,755,284 | 7/1988 | Brooks et al. | 209/20 |
| 4,771,894 | 9/1988 | Lapp | 209/930 X |
| 4,892,647 | 1/1990 | Liddle et al. | 209/700 X |
| 5,071,541 | 12/1991 | Thompson | 209/474 X |
| 5,303,826 | 4/1994 | Buzga | 209/700 X |
| 5,341,935 | 8/1994 | Djerf et al. | 209/11 X |

*Primary Examiner*—D. Glenn Dayoan
*Attorney, Agent, or Firm*—Ronald B. Sefrna

[57] ABSTRACT

A method of separating solid waste materials, in the form of dried particles of substantially uniform size, into constituent materials on the basis of density, with primary stage processing utilizing one or more fluidized bed and cyclonic separator assemblies to separate materials on the basis of density, is provided by the invention. Secondary stage processing utilizing combinations of vibratory conveyors and melt separation assemblies, is also provided. As the waste materials move through the separator assemblies the initial stream is further refined into a plurality of streams of increasingly specific densities as a result of air flow separation of lighter particles from heavier particles in each assembly. Further refined separation may be achieved through the use of vibratory conveyors and melt separation. Air flow separator assembly apparatus and melt separator apparatus, including a plurality of belts each heated to a selected temperature for temporary adhesion of plastic particles thereto, is also provided by the invention.

16 Claims, 11 Drawing Sheets

METHOD AND APPARATUS FOR SEPARATING RESOURCE MATERIALS FROM SOLID WASTE

RELATED APPLICATIONS

This application is a continuation-in-part of application Ser. No. 08/061,285, filed in the United States Patent And Trademark Office on Apr. 29, 1993, and titled "Method Of Separating Resource Materials From Solid Waste", by the same inventors now U.S. Pat. No. 5,341,935.

FIELD OF THE INVENTION

The present invention generally relates to the field of solid waste management and handling, and in its preferred embodiments more specifically relates to a method of and to apparatus for separating constituents from a homogenous stream of solid waste materials.

BACKGROUND OF THE INVENTION

Recovery of materials from municipal and other solid wastes for recycling and reuse is of increasing importance in modern society, and increasing attention has been given to efforts to devise efficient, economical, and workable approaches to recovery of recyclable and reusable materials from the waste stream. In the past, the most commonly used approach has been source separation, in which the generator of the waste materials separates useable or recyclable materials from other wastes before any of the waste materials are removed from the generation site. The reusable or recyclable materials are then further separated to a degree determined by the use or uses to which those materials may be put, or by the willingness of the waste generator to engage in increasingly detailed separation efforts.

In the particular case of municipal wastes, source separation of wastes must be done by each waste generating household, and the willingness of the waste generators to participate in detailed separation programs is often a significant determining factor in the effectiveness of the separation, or recycling program. In even the most effective voluntary recycling programs, participation by household waste generators in source separation of wastes at all is not universal, and participation tends to drop as the complexity of separation increases. Problems also arise from errors made by municipal waste generators in identifying materials, resulting in commingling of recovered materials and reduction in the efficiency of separation. In response to the commingling problem, and often in an effort to increase participation, some recycling programs have provided for a combination of source separation and collection separation approaches. In the combined programs reusable materials are separated from other wastes and initially commingled, with additional separation performed as the wastes are collected from each generator. However, combined programs tend to slow waste collection and often require additional manpower, and any improvement in efficiency has been marginal at best.

Another approach that has been used in municipal recycling programs, either alone or in conjunction with separation by each waste generator, is post-collection separation, in which at least some part of the separation process is carried out after collection of wastes from individual households. Post-collection separation techniques range from simple and incomplete manual separation, based upon visual inspection of the waste stream and identification of recyclable materials, to more complex automatic systems utilizing techniques such as magnetic separation of ferrous metals, induction current separation of non-ferrous metals, and density separation in, e.g. water tanks. The effectiveness and efficiency of such separation techniques varies widely, and has proved to be only partially successful as an overall approach.

For some uses of recovered materials the particular composition of the materials is not as significant as uniformity of density and/or of particle size. For example, in the production of composite materials including recovered waste as filler, the chemical composition of the filler material may be of little importance, while the size and mass of individual particles may be of significant importance. Conventional separation approaches, such as those identified above, are based on separation by material type or chemical composition, and do not address density separation.

There remains a need in the field for a broadly applicable, effective, and economically efficient method of separating reusable and recyclable materials from solid wastes, especially but not necessarily limited to municipal wastes, and there likewise remains a need for apparatus for effectively and economically performing the separation method.

SUMMARY OF THE INVENTION

The present invention provides a method of separating a wide variety of constituent components from a solid waste stream in a continuous automatic process. The method of the invention may be used as the sole approach to separation and segregation of materials from a waste stream, or may readily be used in conjunction with source separation, combined source and collection separation, or preliminary post-collection separation techniques to recover materials either not addressed by or missed by preliminary separation techniques. In the preferred embodiment of the invention it is contemplated that ferrous metals have been previously separated from the waste stream, though separation of ferrous metals may readily be addressed in an alternative step of the method. It is further contemplated that the waste materials to be separated by the method of the invention have been initially shredded and ground to a uniform particle size and configuration, and have been thoroughly dried to remove free moisture from the materials. In a commercial use of the invention, waste materials may be reduced to uniform particles and dried prior to transportation to a facility designed to operate in accordance with the method of the invention, or the particle reduction and drying may be performed in an initial processing facility in physical proximity to the facility embodying the method of the present invention.

The method of the invention utilizes a combination of at least one fluidized bed and one cyclonic separator to separate materials with air flow on the basis of density, utilizes vibratory conveyors to separate materials on the basis of density, and also contemplates the use of controlled temperature conveyor belts to separate plastic materials having generally similar densities but different melting points. The use of fluidized beds and cyclonic separators for density separation, with air as the separation fluid, eliminates the use of water in the separation process and also eliminates the use of wash water for cleaning of materials, thus eliminating the discharge or release of contaminated or polluted water. In the preferred embodiment of the method the air used for separation is recirculated in a generally closed system, essentially eliminating air pollution concerns as well.

In the practice of the method of the invention the prepared waste materials, previously ground to a generally uniform particle size and thoroughly dried, are fed to a fluid separation assembly, including a fluidized bed unit and a cyclonic separator unit. Separation air is forced into and through the fluidized bed unit of the separator assembly at a controlled velocity from the bottom of the fluidized bed of waste materials to the top. As the air flows through the fluidized bed unit it encounters and lifts, or fluidizes, the discrete particles of waste material making up the bed, whereupon lighter particles are entrained in the air stream and carried from the top of the fluidized bed unit and introduced into the cyclonic separator of the separation assembly. Heavier materials fed to the first fluidized bed unit are not entrained in the air stream and fall to the bottom of the unit, where they are removed. In the cyclonic separator of the separation assembly air is forced into and through the cyclonic separator at a controlled velocity from the bottom of the separator to the top. Waste materials are fed into the air stream, and as the air encounters the discrete particles of waste material entering the separator, lighter particles are entrained in the air stream and carried from the top of the cyclonic separator and into a transition unit. In the transition unit, which is of larger volume than the cyclonic separator, the velocity of the air leaving the cyclonic separator is reduced sufficiently for all entrained materials, except dust and fines, to drop out of the air stream. The particles of waste material may be routed from the transition unit to use or storage, or to a feed hopper for introduction to a subsequent separator assembly. The air is routed from the transition unit through filters to remove the dust and fines, and the air is returned in a closed loop to the fluidized bed unit of the separator assembly to repeat the path through the assembly. The dust and fines are recovered from the filters for disposal or use. Heavier materials in the stream fed to the first cyclonic separator unit from the first fluidized bed unit are not entrained in the air stream and fall to the bottom of the unit, where they are removed through an air lock.

Because the particles of waste are of generally uniform size, the division of the particles into an entrained stream and a non-entrained stream is based on the density of the particles, and both particle feed rate and velocity of the separating air may be controlled within specifically defined ranges so that each division of the particle stream may be made around a preselected density. Separation of the waste materials by density affords a high degree flexibility in design and control of the method, and of the characteristics of the segregated materials streams, to closely coordinate with the purposes for which the recovered materials will be used. When the intended use of the recovered materials is sensitive to material density (e.g., individual particle mass), discrete material streams with closely controlled densities but little concern for chemical composition may readily be produced. Alternatively, the apparatus and method may be used to separate materials on the basis of composition. Since the densities of materials of particular composition in the waste stream are known and/or easily determined, the composition of the waste components present in each of the entrained and non-entrained streams can be determined and controlled with a reasonably high degree of accuracy. In the separator assembly described above the entering stream of waste materials is divided into three streams; a heavy stream containing all materials with densities below the first separation value, an intermediate stream containing all materials with densities between the first separation value and a second separation value, and a light stream containing all materials with densities above the second separation value. Each stream may be utilized without further separation, or may be further refined, individually or in combination, in subsequent separation assemblies until the desired degree of final separation is achieved.

In an illustration of a configuration for further processing, the heavy stream and the intermediate stream from the previously described, or first, separation assembly are combined to form a single stream. That heavier, i.e. higher density, material stream is routed to a second separation assembly, which also includes a fluidized bed unit and a cyclonic separator unit. The separation process performed in the second separator assembly is conceptually identical to the first separator assembly process, with modifications in equipment capacity and operating parameters appropriate to the material volume and density divisions to be achieved in the second separator assembly. In the second separator assembly the combined stream of heavier particles from the first assembly has been further refined into three streams, each containing materials with densities below, between, or above the control densities established for the second separator assembly. Any or all of those streams may be further treated in subsequent separator assemblies, individually or in combination, or may be routed to storage or use.

Carrying forward the illustration, the stream of lighter materials from the first separator assembly is fed to a feed hopper and to a third separator assembly, also including a fluidized bed unit and a cyclonic separator unit, where the materials are again separated by density into three exit streams. Again, any or all of those streams may be further separated in additional similar separator assemblies. After the final separator the velocity of the air stream is reduced in a final transition unit where particles with the lowest selected density are allowed to drop out of the air stream. The separation air is then passed through a filtering and the filtered air is returned to the beginning of the loop.

It will be understood that the air flow separation technique may be used to achieve a separation of a heterogenous stream of waste materials into a plurality of streams, each including materials with densities spanning a specific targeted range, and that the density range for each stream may be selected by modifying the operating parameters within each air flow separation assembly.

The particles removed from the bottom of each separator may be subjected to further separation processing, depending upon the composition of the respective bottoms stream and the intended use for the material in each bottom stream. The particular separation technique or techniques used to further separate components contained within each bottom stream is selected based upon the types of material involved. Particular techniques include, but are not limited to, magnetic separation, vibratory bed separation, and melt separation.

In the event the waste materials entering the separation process contain ferrous metals, and those metals are not removed prior to entry into the first cyclonic separator, the bottom materials in which ferrous metals have been deposited may be passed through a conventional magnetic separator unit to remove and recover the ferrous metals.

Vibratory conveyors may be used to separate materials of different densities that have been deposited in the same bottom stream or streams from one or more of the primary separators. In one approach to vibratory conveyor separation, a continuous conveyor, or each of a series of "end to end" conveyors, is inclined across the width of the conveyor so that one edge is raised above the opposite edge, vibratory motion is transmitted from a vibrator motor to the conveyor or conveyors. Material is continuously fed onto the front end of the conveyor at the elevated edge. As the conveyor moves, carrying the material along the length of the conveyor, heavier (i.e., more dense) material moves across the width of the conveyor more rapidly than does lighter material, in response to the combination and interaction of motion produced by the vibrating conveyor and gravitational forces, and is allowed to drop from the edge of the conveyor. Since the particles fed onto the conveyor are of uniform size, the movement of the particles across the conveyor, and thus the location at which particles drop from the conveyor, is a function of density. Material particles dropping from the conveyor at different points along the length of the conveyor are collected and routed to storage or use, or to further processing stages. In the preferred embodiment of the method, vibratory separation is utilized as a final step for "bottom" streams between the final air flow separation assembly and storage.

Other techniques, such as melt separation, are used to further separate materials, such as different types of plastics, that have similar densities but different melting points. In melt separation the material to be separated is fed onto a series of conveyors in a thin layer essentially one particle thick, with each conveyor in the series heated to a temperature generally equal to the melting temperature of a specific type of plastic. Plastic materials with the lowest melting point begin to melt when placed in contact with the first conveyor and the particles of that type of plastic adhere to the conveyor. As the first conveyor turns over the final roller to begin the return portion of the conveyor loop, non-adhered particles fall from the first conveyor onto the second conveyor in the series and the adhered particles remain attached to the conveyor surface until they are mechanically removed by, e.g., a scraper blade. This sequence of steps is repeated with the second and subsequent conveyors at respectively higher temperatures until all the plastic materials have been separated and removed.

It will be understood that the method may be adapted within the scope of the invention to achieve various degrees of separation, in terms of both the overall separation results and the separation specificity that may be achieved within each phase or step of the method. The adaptations or adjustments may be made in response to the types of materials in the initial waste stream to accommodate parameters such as varying levels of preliminary separation, or in response to a selection of desired output materials or material characteristics and the degree of separation of those materials desired. For example, the operating parameters may be designed and adjusted to result in essentially complete separation and removal of heavy inorganic materials, such as metal and glass, and plastic materials for recycling, leaving the majority of compostable organic materials unseparated for routing to a composting operation. In a further example, paper materials may be removed for recycling in addition to the previously mentioned components. The method of the invention is designed to allow a wide range of operating parameter adjustment while using the same physical equipment to practice the method, providing an extremely flexible approach to material separation and resource recovery.

The steps and features of the method of the invention, and apparatus of the invention, will be described in more detail with reference to the accompanying drawing figures.

DETAILED DESCRIPTION OF THE PREFERRED EMBODIMENT

Figure 1:
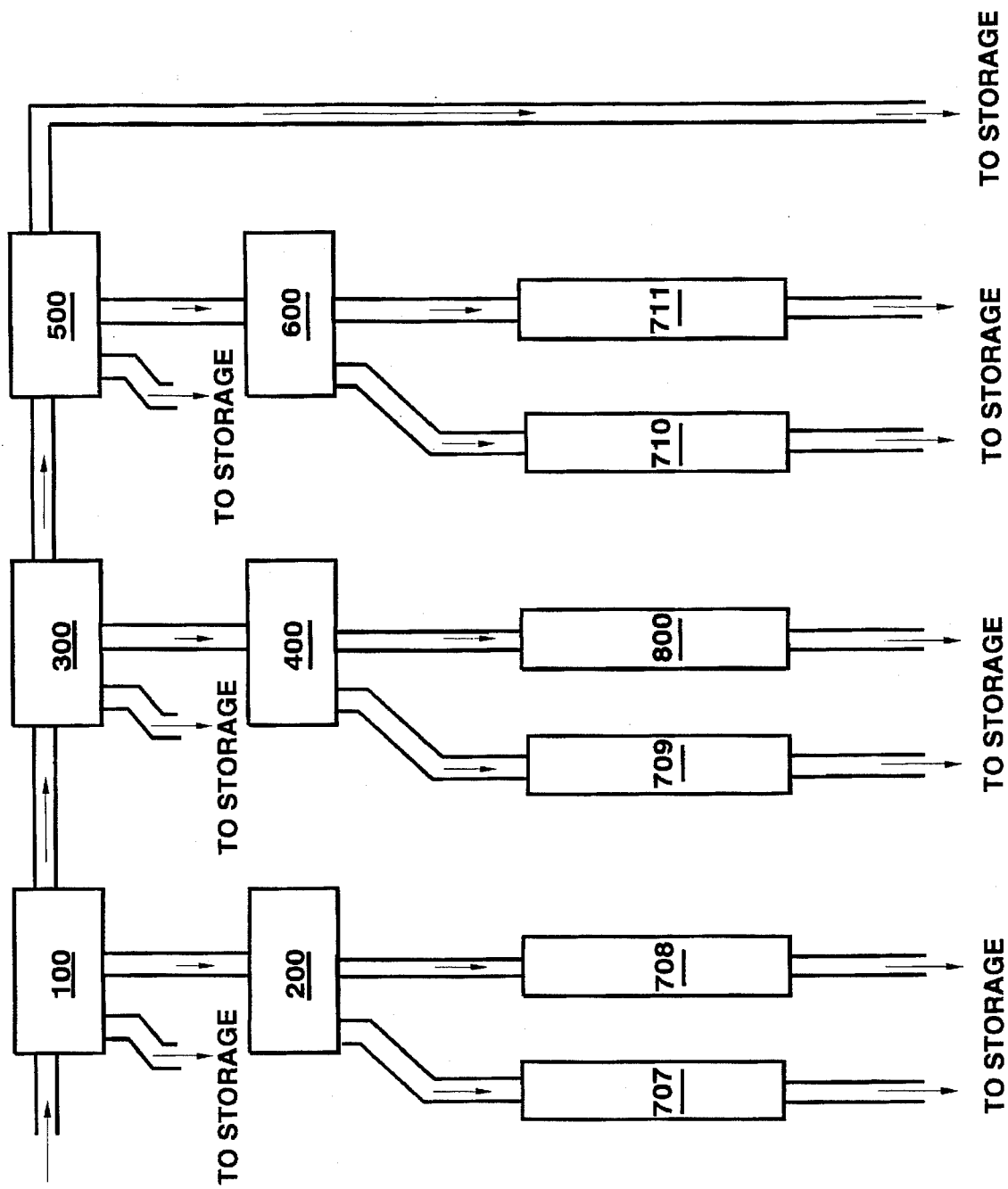
FIG. 1 is a schematic block diagram illustrating primary separation and secondary separation stages of a preferred embodiment of the method of the invention.

The method of the invention may be conceptually divided into two stages of material separation: 1) a primary separation stage, using forced air as the separation fluid, performed in one or more separator assemblies, each including a fluidized bed unit and a cyclonic separator unit, and 2) a secondary separation stage in which the primary material separation is further refined for separation and recovery of specific materials. It is contemplated that ferrous metals have been removed from the waste materials prior to introduction of the waste materials into a facility utilizing the method of the present invention, and the following description does not address steps for removing ferrous metals. Initial processing to remove ferrous metals is, in and of itself, within the ability of those of normal skill in the art, and may readily be performed as an adjunct or addition to the described method if the materials to be separated have not been previously treated.

Solid waste materials to be processed in accordance with the preferred embodiment of the method of the invention enter the processing in the form of loose, dry particles of uniform dimension. The method of the invention is used to separate materials on the basis of density, and it is important for suitably effective performance of the method that the particles of waste material introduced for separation be essentially devoid of moisture, so that the particles may be separated on the basis of the density of the material itself without density alteration resulting from absorbed moisture. It is also important that the particles be of small size, uniform size, and uniform configuration. Each particle should be small enough in size, and thus of low enough weight, to be readily amenable to fluidization in a fluidized bed apparatus and to be amenable to entrainment in a stream of air moving a reasonable velocity consistent with the design of typical cyclonic separator apparatus. Uniformity of size is important so that all particles of a material having a certain particular density are of essentially identical mass, and separation of particles by mass effectuates separation by material density. The particles should be of uniform configuration so that each particle presents substantially the same cross-sectional area to an air stream in a fluidized bed apparatus or in a cyclonic separator apparatus. It is preferred that the waste materials be processed to suitable form prior to introduction to processing in accordance with the method of the present invention, as, for example, in accordance with the method disclosed in our co-pending application entitled "Method Of Treating And Preserving The Resource Value Of Solid Waste". However, in order to ensure proper particle preparation, the use of a preliminary grinder unit to reduce waste materials to uniform particles is contemplated, such as the unit depicted in FIG. 3 and designated by reference numeral 10.

Waste materials enter the processing in a single stream comprising a heterogenous mixture of all waste components. The waste materials are passed through a primary processing stage in which air flow is utilized for separation of the materials on the basis of density. The primary processing stage includes at least one air flow separator assembly, preferably comprising a fluidized bed unit and a cyclonic separator unit. In the separator assembly the single incoming material stream is separated into three streams, a heavy stream including materials with densities below a preselected value, a light stream including materials with densities above a second preselected value, and an intermediate stream including materials with densities between the first and second values.

For some purposes or intended uses of recovered waste materials the initial separation into the three streams of high, intermediate, and low density may be sufficient processing. However, it is anticipated that further material separation will typically be required, and the method is sufficiently flexible in design to readily accommodate almost any desired degree of separation. Accordingly, the following description of the method of the invention addresses the use of a plurality of air flow separator assemblies for primary stage processing and describes a particular configuration of material flow paths through the separator assemblies. However, it should be understood that the scope of the method of the invention is not limited to the particular number of separator assemblies described or to the particular material flow configuration described, but encompasses a wide variety of configurations to provide the needed flexibility in separation parameters.

Figure 2:
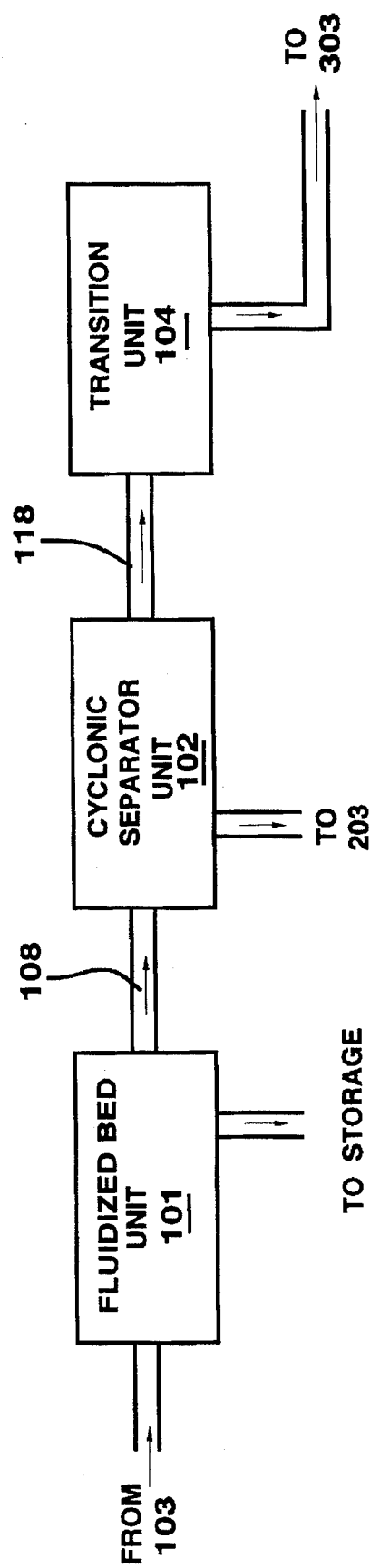
FIG. 2 is a schematic block diagram illustrating the steps of the preferred embodiment of the primary separation stage of the method of the invention.
Figure 3:
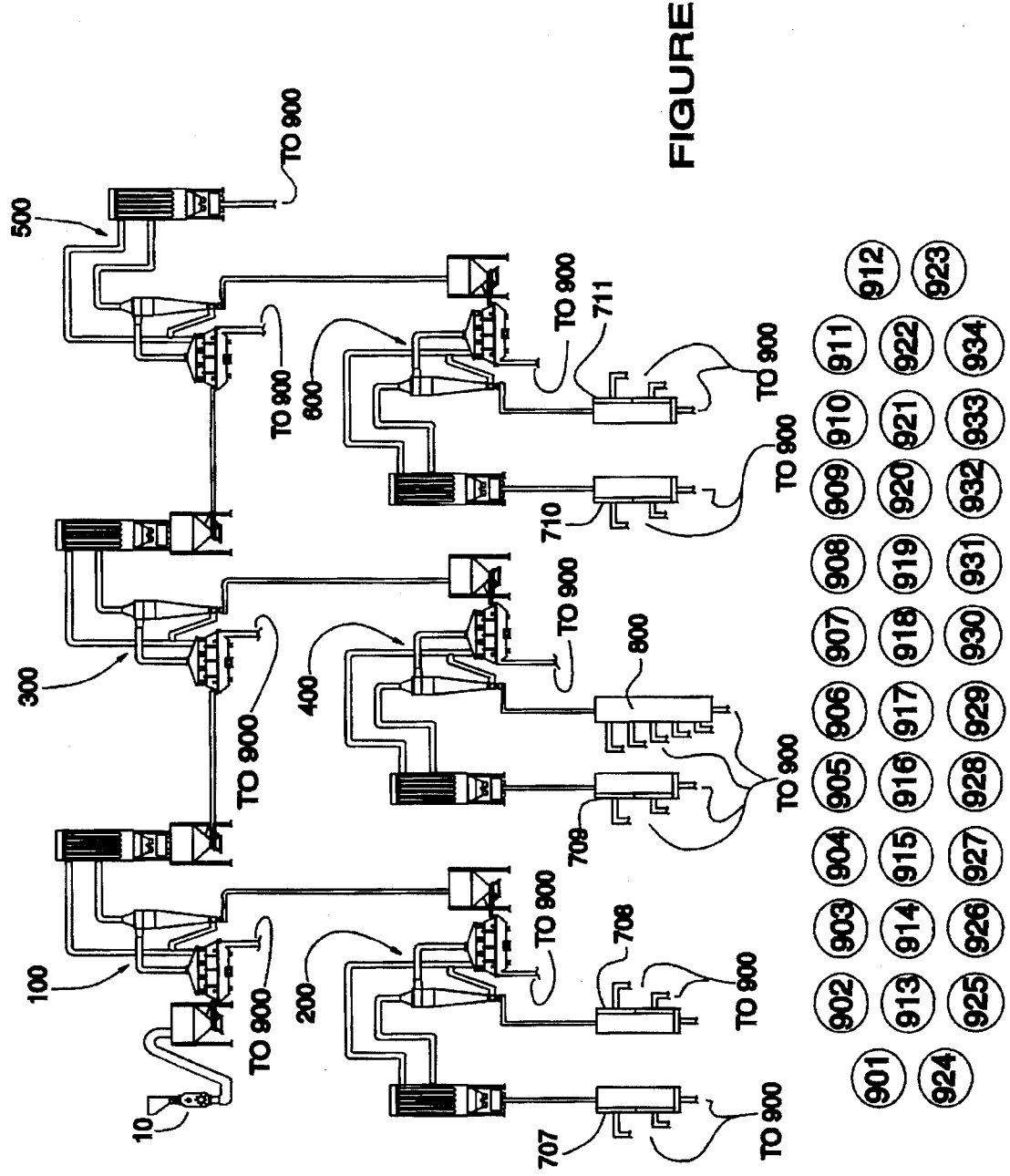
FIG. 3 is a partial schematic diagram of a preferred embodiment of the method of the invention, generally illustrating apparatus used to practice primary separation stage and secondary separation stage steps of the method.

FIGS. 1 through 3 of the drawings illustrate the flow of materials through a selected configuration reasonably representative of the preferred embodiment and best mode for separating a single stream of incoming material into more than ten final material streams.

In the illustrated embodiment the first separation of the incoming stream into three streams as described above is performed in a first separator assembly 100. The materials in the heavy stream from the first separator assembly 100 are routed to storage or use, and the intermediate stream is routed to a second separator assembly 200. In the second separator assembly, which also includes a fluidized bed unit and a cyclonic separator unit, the entering waste materials are further separated into three streams by density; a heavy stream, a light stream, and an intermediate stream. The materials of the heavy stream from the second separator assembly are routed to storage or use and the intermediate stream is routed to further secondary stage processing or to storage. The light stream from the second separator assembly is also routed to secondary stage processing or to storage.

The light stream of materials leaving the first separator assembly is fed to a third separator assembly 300, again preferably including a fluidized bed unit and a cyclonic separator unit, where the steam of incoming materials is separated into a heavy stream, a light stream, and an intermediate stream. As with the heavy and intermediate streams from the first separator assembly, the heavy and intermediate streams from the third separator assembly may be routed to storage or use, or to a fourth separator assembly 400. The light stream of materials from the third separator assembly is fed to a fifth separator assembly 500. In the fourth separator assembly the materials are separated into three steams which may be further processed or sent to storage, similar to the treatment of the materials exiting the second separator assembly.

The light stream of materials from the third separator assembly is further separated in the fifth separator assembly 500 into three streams. The light stream and the heavy stream from the fifth separator assembly is routed to storage or use. The intermediate stream from the third separator assembly is fed to a sixth separator assembly 600. As in the previous assemblies, the entry stream to the sixth separator assembly is divided into three streams of different densities, and each stream is routed to storage or use.

Figure 4:
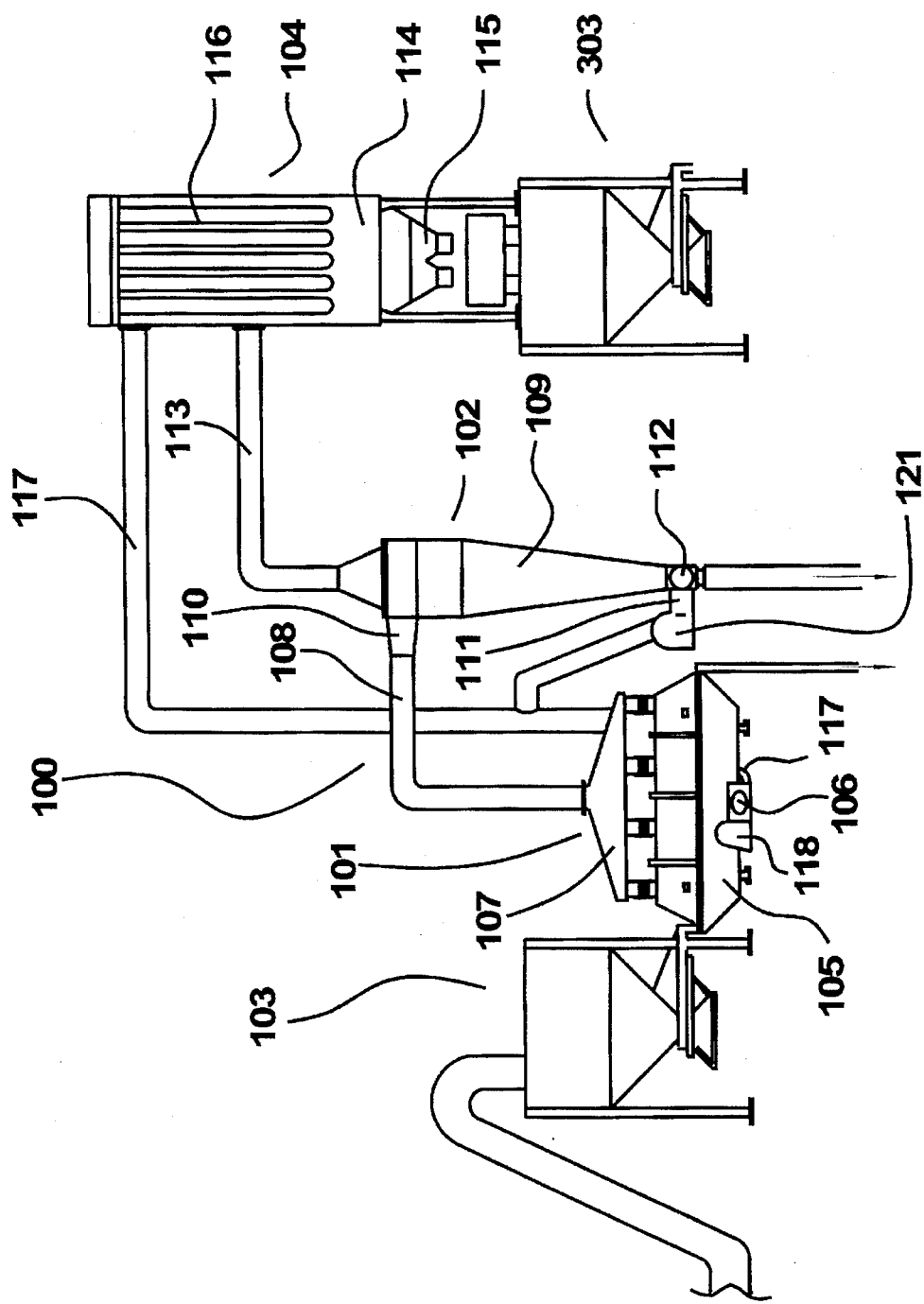
FIG. 4 is an illustration of the preferred embodiment of the air flow separator assembly of the invention.

Each of the primary stage separator assemblies 100 through 600 is of the same general design, and includes a fluidized bed unit and a cyclonic separator unit. Referring to FIG. 4, illustrating separator assembly 100, the fluidized bed unit is designated by reference numeral 101 and the cyclonic separator unit is designed by numeral 102. Separator assembly 100 also includes material feed hopper 103 and transition unit 104 as major components. Fluidized bed unit 101 includes bed container 105, air inlet 106, collection hood 107, and material conduit 108. Cyclonic separator 102 includes body 109, material inlet 110, air inlet 111, air lock 112, and material conduit 113. Transition unit 104 includes chamber 114, material outlet 115, filters 116, and air return line 117.

Material entering separator assembly 100 is deposited in feed hopper 103 from which it is continuously fed into bed container 105 of fluidized bed unit 101. Air is forced into bed container 105 through air inlet 106 and is distributed within bed container 105 to flow upward through the bed of materials therein. As the air flows through the bed of materials the particles are lifted and lighter particles of waste material are entrained in the air stream and carried into collection hood 107 and on into material conduit 108, connected between fluidized bed unit 101 and cyclonic separator unit 102. Heavier materials confined in bed container 105 are not entrained in the air flowing through the bed and are dropped from the fluidized bed to exit from bed container 105.

Figure 5:
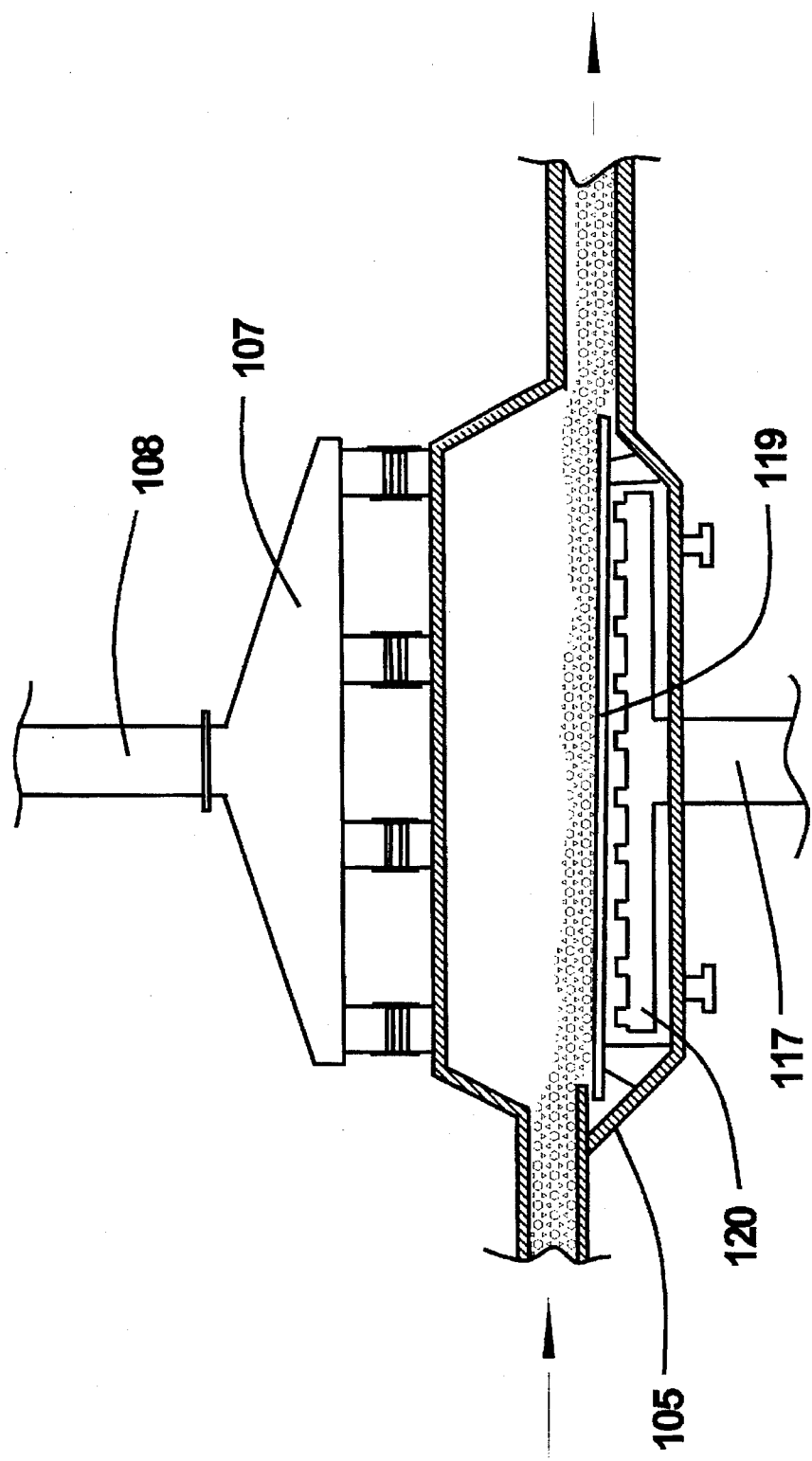
FIG. 5 is a partially sectioned side view of the preferred embodiment of the fluidized bed unit of the air flow separator assembly of the invention.

In order to achieve separation of the materials at the preselected density value, it is important that precise control of the velocity of the air flowing through the bed of materials in bed container 105 be maintained. Air is forced through air inlet 106 by fluidized bed blower unit 118 and into bed container 105. As shown in FIG. 5, bed container 105 includes a bed membrane 119 disposed above air distribution outlets 120 which receive air from inlet 106 and distribute it in an upward flow pattern within bed container 105. Bed membrane 119 serves to suspend and support the bed of waste materials in bed container 105 while allowing separation air to flow through the membrane and through the bed to entrain lighter particles from the bed. The lifting force of the air flow is directly proportional to the air velocity, and it is accordingly preferred that blower unit 118 be a precisely controllable variable speed blower that may be adjusted to achieve entrainment of only particles with densities above the selected value. It will be understood that the operating parameters (e.g., air velocity) for fluidized bed units associated with downstream separator assemblies will vary from the parameters selected for the initial unit, to accommodate the characteristics of the material fed to each unit and the density value selected as the separation point in downstream units. Accordingly, it is preferred that the blowers associated with the fluidized bed units be independently controlled, although a central blower system with independent flow rate controls at each unit could be utilized within the scope of the invention. In the preferred embodiment of the method the flow of materials through the processing apparatus is continuous rather than by batch, and the heavy stream of material is removed from bed container 105 as incoming material is fed to the bed container. As depicted in FIG. 5, it is preferred that the entry and exit points be at opposite ends of bed container 105, and that the waste material be gradually moved from the entry point to the exit point over the bed membrane. In the preferred embodiment of the fluidized apparatus of the invention, bed membrane 119 is disposed at an angle to the horizontal with the end corresponding to the material entry point at a higher elevation than the end corresponding to the exit point. The incline in the membrane encourages movement of the waste materials from the entry point to the exit point as the materials circulate in the fluidized bed. Movement of the materials can also be facilitated by vibrating membrane 119, and the use of a vibrating membrane is also preferred. Since the mixed materials to be separated can be expected to contain some materials of sufficiently high density that the material particles are not lifted by the separation air into the circulating bed, bed circulation alone will not move those materials across the membrane and heavy particle accumulation will occur without vibration of the membrane.

Lighter materials carried in the air stream through conduit 108 enter cyclonic separator 102 through material inlet 110, and encounter a stream of air flowing through body 109 from air inlet 111. From the materials entering cyclonic separator 102, lighter materials are entrained in the cyclonic air stream and are carried from body 109 through conduit 113. Materials too heavy to be entrained in the air stream fall to the bottom of body 109 and are removed through air lock 112. Air and entrained particles of the waste materials flow through conduit 113 into chamber 114 of transition unit 104. Chamber 114 is of sufficiently large dimension that the air entering chamber 114 loses velocity, allowing the entrained particles to drop out of the air flow to the bottom of the chamber and exit transition unit 104 through material outlet 115. The exiting materials fall into hopper 303 of separator assembly 300. The air exits chamber 114 through filters 116, which remove dust and other fines from the air, and is conducted through air return line 117 to fluidized bed unit 101 in a closed loop.

As with fluidized bed unit 101, it is important that the flow of air through cyclonic separator 102 be precisely controlled, so as to achieve separation of particles at the selected density point, with lighter particles carried with the air flow out the top of the cyclonic separator and with heavier particles falling through the air flow to the bottom of the unit. Separation air is forced through air inlet 111 by a cyclone blower unit 121, and as with blower unit 118, it is preferred that blower unit 121 be variable speed. However, other suitable means for adjustment of air volume and velocity may be used if desired.

It is also important for proper separation that the flow of air through the fluidized bed unit and the flow of air through the cyclonic separator unit be coordinated. The air, with entrained particles, from the fluidized bed unit flows through the cyclonic separator, along with additional separation air introduced to the cyclonic separator through air inlet 111. However, the velocity of the air flowing through the portion of the cyclonic separator in which separation occurs is lower than the velocity of the air leaving the fluidized bed unit, so that the heavier particles entrained in the air stream from the fluidized bed fall out of the stream in the cyclonic separator. The separation of the heavier particles from the lighter particles will occur in a transition zone within the portion of body 109 where materials from the fluidized bed unit enter through material inlet 110 along with the separation air from the fluidized bed unit. Since the total volume of air in body 109 increases with introduction of separation air and entrained particles through material inlet 110, the cross-sectional area of body 109 is increased in the area of the transition zone in comparison to the cross-sectional area below the transition zone so as to accommodate the increased air volume while maintaining the desired air velocity into outlet conduit 113.

As an alternative to directing the total volume of air flowing from the fluidized bed unit into the cyclonic separator, particles may be dropped out of the air flowing in conduit 108 upstream from material inlet 110 and the majority of the air from the fluidized bed unit returned to that unit without passing through the cyclonic separator. Such intermediate separation of the particles from the air stream may be accomplished in a transition unit similar to unit 104 if the alternative approach is used.

Additional separator assemblies 200 through 600 are essentially identical in design to separator assembly 100, and the description of the components of separator assembly 100, identified by "100 series" reference numbers, is equally applicable to the components of separator assemblies 200 through 600. In addition to achieving effective separation of materials, the fluidized beds and cyclonic separators perform an effective cleaning function. It is generally necessary for recovered materials intended for recycling or reuse to be thoroughly cleaned after separation and recovery, and typical approaches use substantial volumes of water for cleaning. With the method of the invention the particles are suspended in and agitated by the air flow in both the fluidized bed units and the cyclonic separator units, and that agitation results in repetitive collisions of particles with each other and with the unit structures. As a result of those collisions the particles are abraded and the particles surfaces are thoroughly cleaned during the movement of the particles through the apparatus. The dust and other fine contaminant particles produced from the cleaning are removed from the air stream by filters 116. The coincident particle cleaning without the use of water or other cleaning agents provides significant advantages in cost reduction and pollution abatement.

Figure 6:
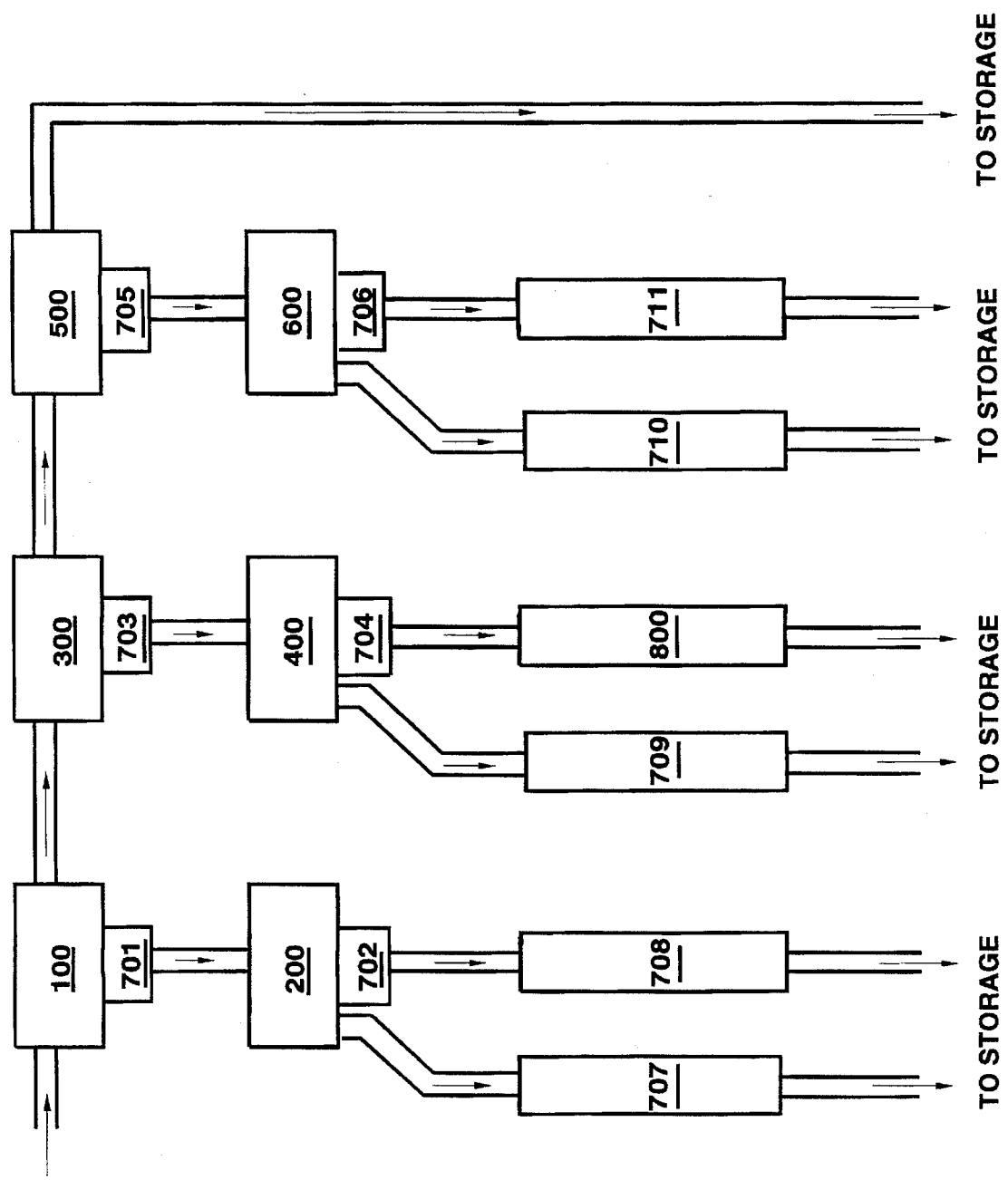
FIG. 6 is a schematic block diagram illustrating primary separation and secondary separation stages steps through a plurality of separator assemblies of an alternative embodiment of the method of the invention.
Figure 7:
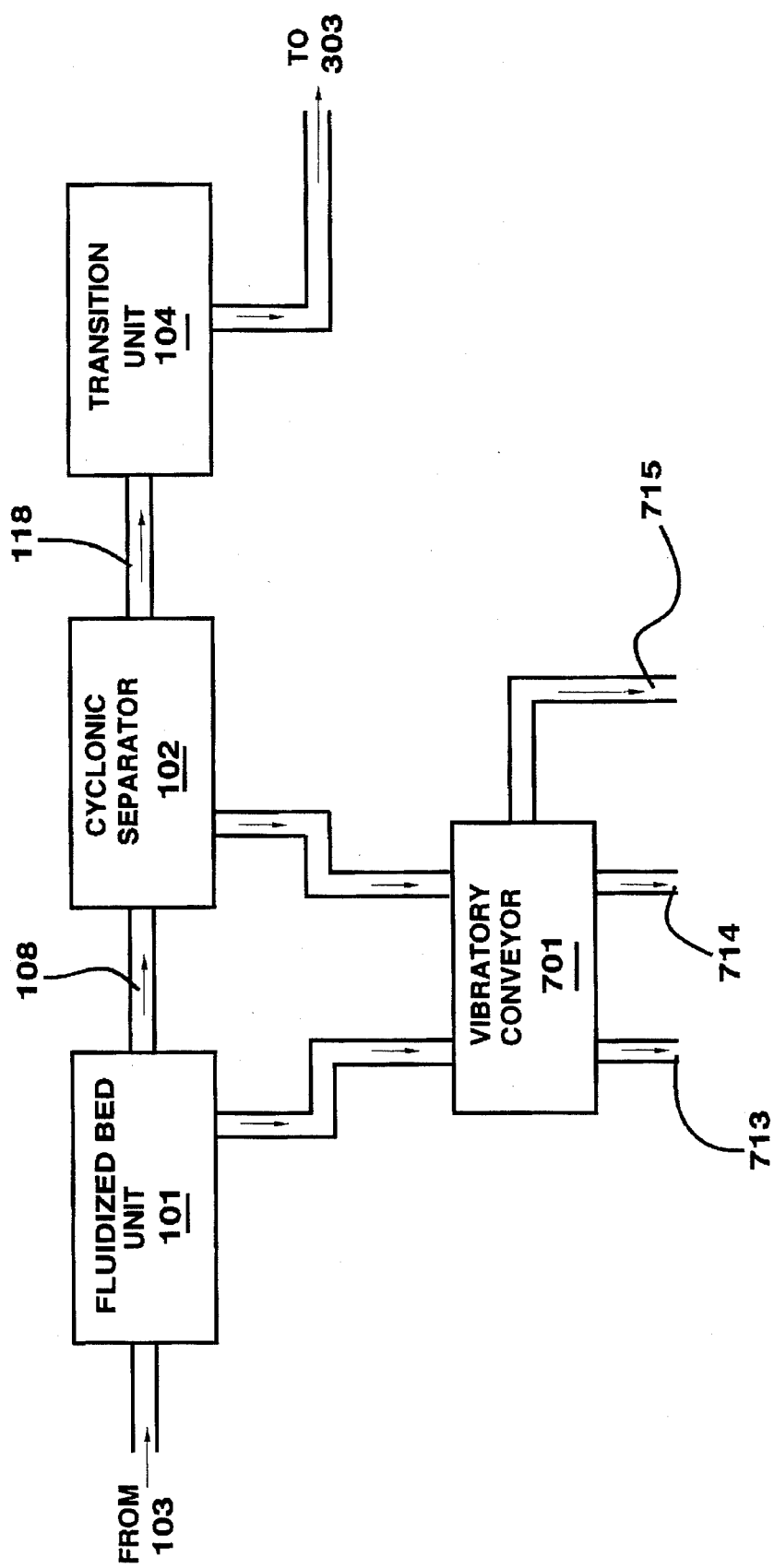
FIG. 7 is a schematic block diagram illustrating the steps of the primary separation stage of the method of the invention with alternative secondary separation stage steps.
Figure 8:
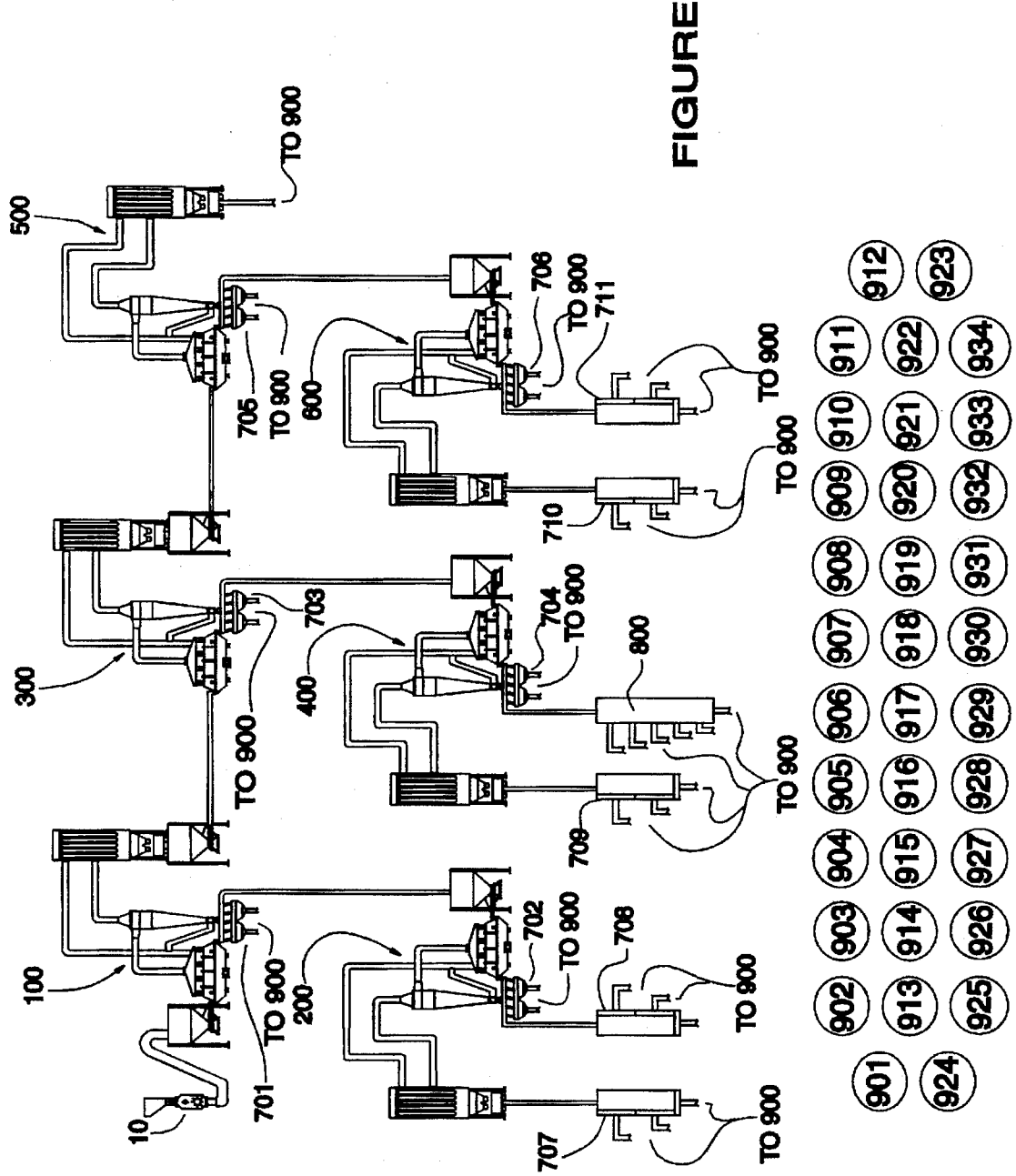
FIG. 8 is a partial schematic diagram of an alternative embodiment of the method of the invention, generally illustrating apparatus used to practice primary separation stage and secondary separation stage steps of the method.
Figure 9:
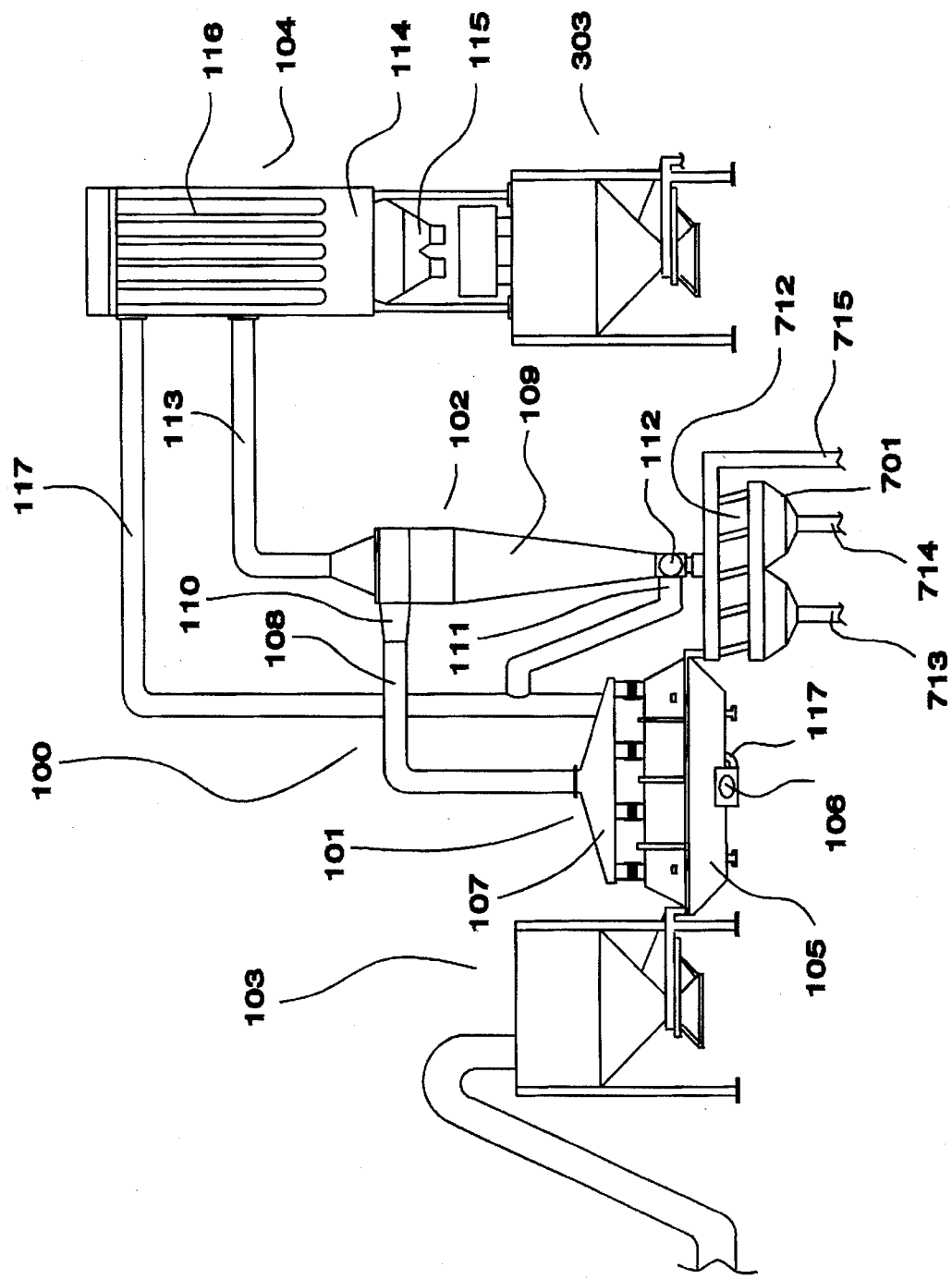
FIG. 9 is an illustration of an alternative embodiment of the air flow separator assembly of the invention.
Figure 10:
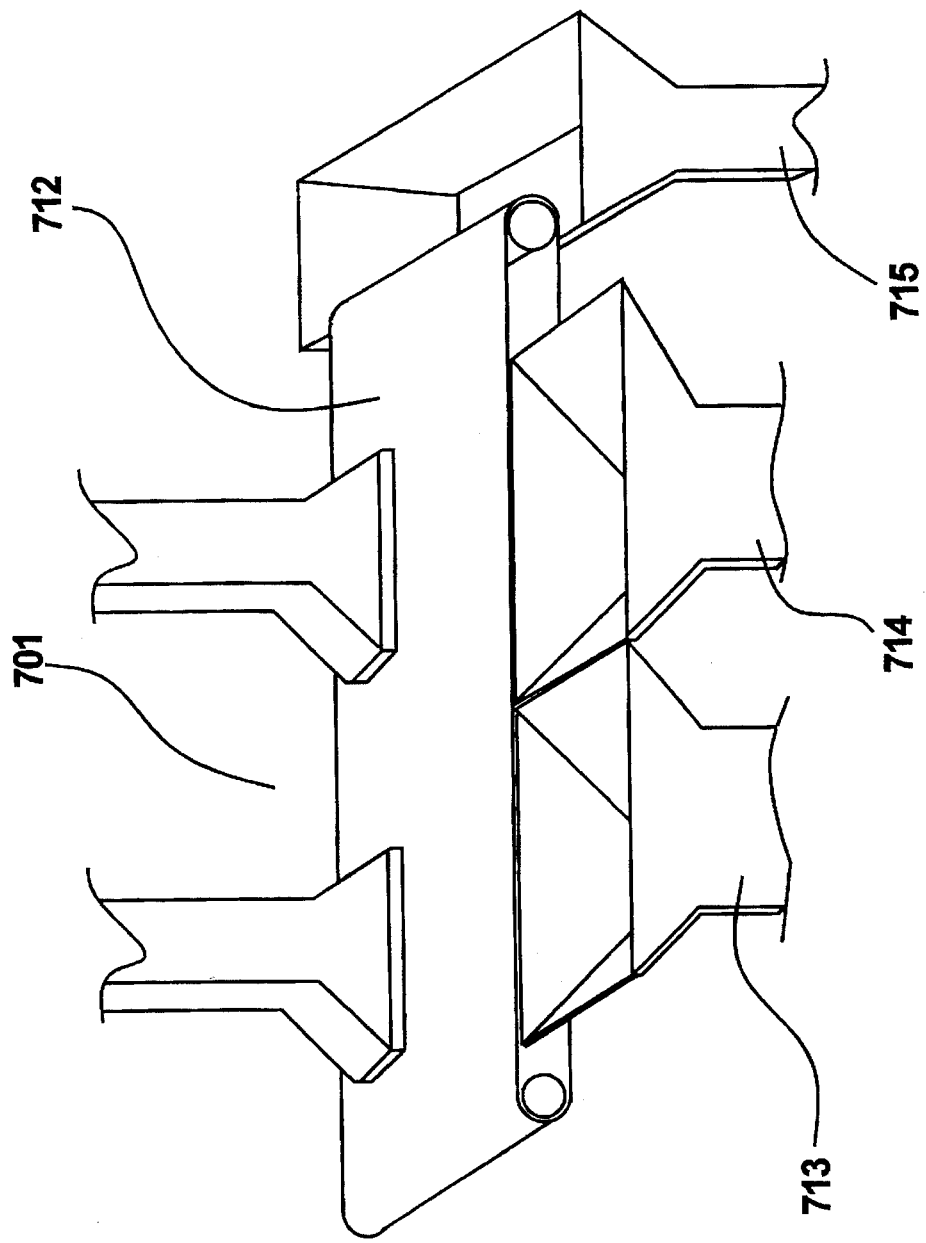
FIG. 10 is a schematic illustration of a vibratory conveyor separator suitable for use in practicing the method of the invention.

In the preferred embodiment of the invention, streams of waste material are subjected to second stage processing before being introduced to storage. Second stage processing may also be used between air flow separator assemblies to achieve some further refinement of the stream composition before it is introduced to the next separator assembly in the series. In the preferred embodiment the initial second stage processing utilizes vibratory conveyors, such as the conveyor assembly generally designated by reference numeral 701 in FIGS. 6, 7, and 8. As illustrated in FIG. 10, the heavier material stream from fluidized bed unit 101 is placed on an inclined vibrating belt 712 at the beginning of the belt path. More dense material particles move across the incline, and fall from the belt, more rapidly than less dense materials, so the exit location along the length of the belt path is proportional to density. Materials of lower density, such as materials removed from cyclonic separator 102 through air lock 112, may be placed on belt 712 farther along the belt path, at a location where the densities of those materials generally matches the densities of the materials remaining on the belt at the entry location. The materials falling from the edge of the belt are collected in density zones and routed to storage through, e.g., conduits 713 and 714 Materials of sufficiently low density to remain on the belt through the full belt path are routed to storage or to the next sequential primary stage separator assembly through conduit 715.

FIGS. 6 through 9 illustrate an alternative embodiment of the method of the invention, in which secondary stage processing steps are utilized between air flow separator assemblies. In the illustrated alternative embodiment the processing in separator assembly 100 is performed in the same manner as described above. The heavy stream from the first separator assembly is routed to storage through a second stage vibratory conveyor for further refinement and collection of materials segregated by the vibratory conveyor. The intermediate stream is also routed through a second stage vibratory conveyor for segregation and removal of a portion of the materials initially present in the intermediate stream. The remaining materials in the heavy and intermediate streams from the first separator assembly 100 are combined and routed to a second separator assembly 200. In the second separator assembly the entering waste materials are further separated into three streams; a heavy stream, a light stream, and an intermediate stream. Following second stage processing on a vibratory conveyor as described in connection with the first separator assembly, the materials from the heavy and intermediate streams of the second separator assembly are routed to further secondary stage processing and to storage. The light stream from the second separator assembly is also routed to secondary stage processing and to storage.

The light stream of materials leaving the first separator assembly is fed to a third separator assembly 300, where the single steam of incoming materials is separated into a heavy stream, a light stream, and an intermediate stream. As with the heavy and intermediate streams from the first separator assembly, the heavy and intermediate streams from the third separator assembly are subjected to second stage separation processing and recombined to enter a fourth separator assembly 400. The light stream of materials from the third separator assembly is fed to a fifth separator assembly 500. In the fourth separator assembly the materials are separated into three steams which are further processed and the segregated materials sent to storage, as with the treatment of the materials exiting the second separator assembly.

The light stream of materials from the third separator assembly is further separated in the fifth separator assembly 500 into three streams. The light stream from the fifth separator assembly is routed to storage, through a second stage separation unit. The heavy and intermediate streams from the third separator assembly are subjected to second stage separation, recombined, and fed to a sixth separator assembly 600. As in the previous assemblies, the single entry stream is divided into three streams of different densities, and each stream is routed through second stage separation and the materials then directed to storage.

In the alternative approach to use of the method in the manner described, the use of second stage vibratory conveyor processing results in more extensive segregation of the initial stream of waste materials with the same number of primary separator assemblies. With particular alternative embodiment described, thirty-four final material streams are created from the single stream entering the processing facility. Each of vibratory separation units 702 through 711 illustrated for the alternative embodiment includes the same general components described above for unit 701.

Figure 11:
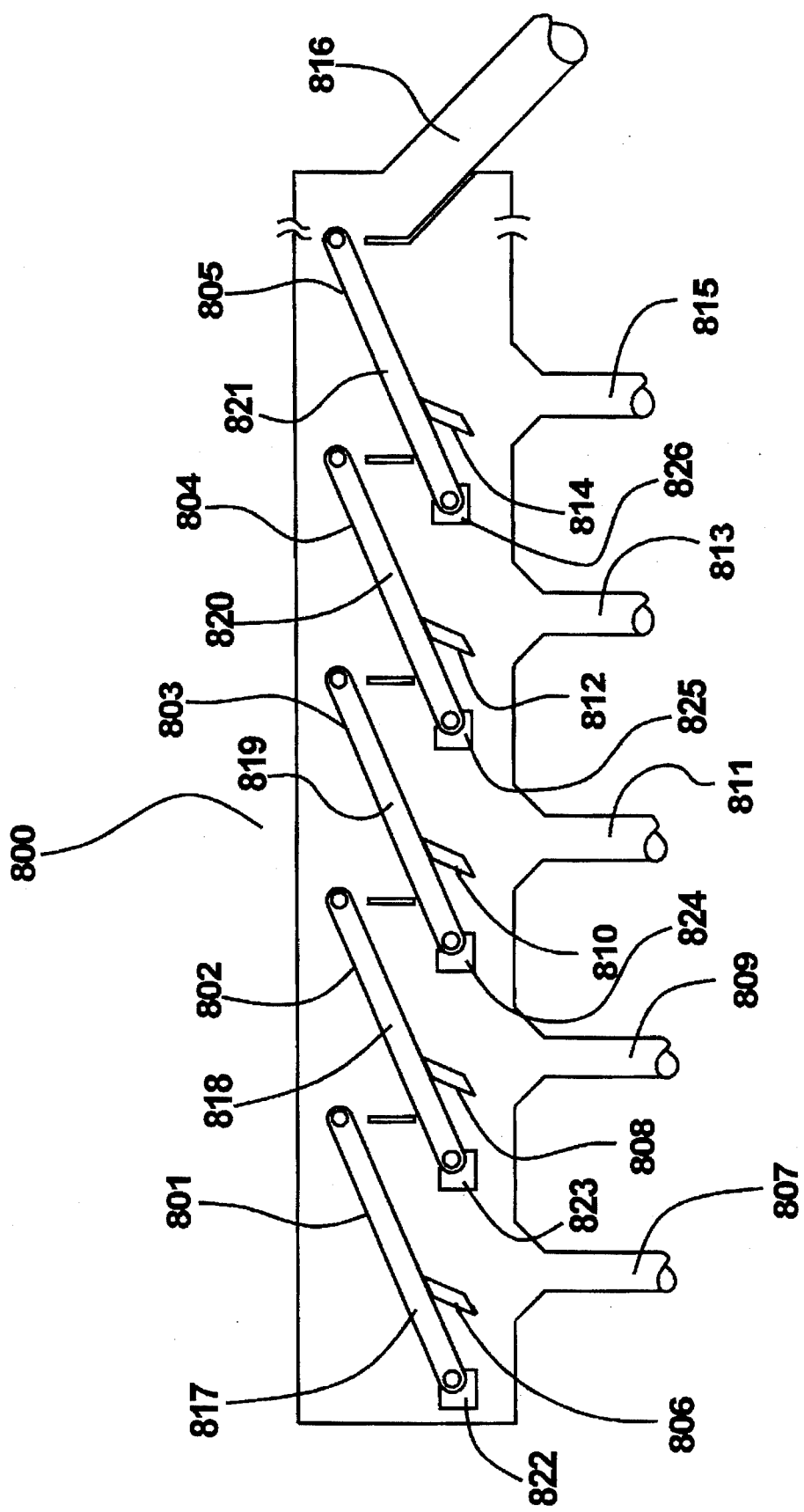
FIG. 11 is schematic illustration of the preferred embodiment of the melt separator apparatus of the invention, also illustrating the melt separation steps of the method of the invention.

In the preferred embodiment of the method of the invention second stage separation in the form of "melt separation" is used in addition to mechanical vibratory separation to further separate plastic materials of differing chemical composition, based upon melting point. As generally illustrated in FIG. 11, a melt separation unit, generally designated by reference numeral 800, comprises a series of heated belts, designated in the illustration by reference numerals 801 through 805. It should be understood that although five belts are depicted in FIG. 11, that number was chosen solely for convenience and in the interests of clarity of illustration, and is not to be taken as a limitation. The actual number of belts utilized in a facility embodying the invention may be as few as one, and as many as are necessary to accommodate the number of discrete plastic types and the degree of separation desired. It is contemplated that a typical apparatus will include between twelve and twenty belts, for example.

Each belt is heated on its upper surface to a specific temperature selected to match the melting point of a particular plastic type, such as polyvinyl chloride, high density polyethylene, etc. In the illustration belt 801 is heated to the lowest temperature, belt 805 is heated to the highest temperature, and the intermediate belts heated to sequentially increasing intermediate temperatures. In general, different types of plastics, though they may have very similar densities, have different melting temperatures, so one particular plastic type will melt at the temperature at which each belt is maintained, but will not melt at lower temperatures. A stream of particles of mixed plastics or including mixed plastics is conveyed to unit 800 and placed on moving belt 801 in a single layer so that each particle is in contact with the belt surface. As the materials are carried by belt 801 the particles of plastic with a melting point at the temperature of belt 801 begin to melt and adhere to the surface of the belt. When the belt moves over its upper roller all non-adhered materials fall from belt 801 to belt 802, while the adhered particles remain on belt 801 as it begins the return portion of the continuous loop path followed by each segment of the belt. The belt surface is allowed to cool slightly after passing over the upper roller, to a temperature below the melting point of the adhered plastic, allowing the particles to resolidify. The particles are removed from belt 801 by scraper 806 and exit the unit through conduit 807. The same sequence of surface melting, adhesion, cooling, and removal of particles of particular plastic types is repeated on each of the subsequent belt assemblies, with the separated plastics exiting unit 800 through conduits 809, 811, 813, and 815 in addition to 807. Remaining materials exit the separation unit through conduit 816. The belts are depicted in FIG. 11 in a horizontal array, but it should be understood that the belts may readily be disposed in a vertical array or in a combination of horizontal and vertical arrays without departing from the scope of the invention.

Since the particles of material processed in accordance with the method of the invention have been thoroughly cleaned in the primary stage separation assemblies, the plastic particles entering melt separation unit 800 are free of the surface dirt and contamination that can detrimentally affect both melting and adhesion between particle and belt. Further, the plastic particles exiting melt separation unit 800 are clean and each plastic material stream is free of contaminating materials. The plastic materials may thus be used without further cleaning, and the cost and pollution concerns associated with washing and other cleaning techniques are eliminated.

Accumulation of plastic material on any or all of the belts of the melt separator is a very detrimental, and the preferred embodiment of the separator apparatus is designed to eliminate accumulation problems. In the preferred embodiment the belts are coated with a low friction adhesion-resistant coating formed of a material such as tetrafluoroethylene (commercially available under the Teflon trademark). The coating provides a smooth impermeable surface to which melting plastic particles will lightly adhere, or tack, with a bond strength that is just sufficient to support the weight of the particles as the belt moves around the upper roller and begins the return passage to the lower roller. The force required to break the light adhesion to the belt is less than the force required to shear the pellet with the scraper, and the pellets are completely removed from the belt without leaving an accumulating residue. It is further preferred that the scrapers be formed of the same tetrafluoroethylene (Teflon) material used for the belt coating, to eliminate the potential problem of plastic accumulation on the scraper and to reduce wear of the coating material resulting from contact between the scraper and the belt surface. It is further preferred that the scraper be spring loaded or otherwise biased against the belt surface to maintain contact without excessive force.

As with the air flow separator apparatus, precise control of operating parameters for the melt separator apparatus is important for its efficient and cost-effective use. The two most significant control parameters are the belt temperature and the residence time of particles on the heated portion of the belts. Although plastic materials of different types typically have different melting points, there may be only a few degrees difference between the melting points of two plastics to be separated from each other, and it is desirable for the belt temperatures to be controllable within a narrow range. In the preferred embodiment of the melt separator apparatus, the belts are formed of woven stainless steel or other suitable metallic material, and are heated by inductive heating units, designated by reference numerals 817 through 821, associated with belts 801 through 805, respectively. Inductive heating, which is known in the art for other purposes, allows very precise temperature control and is preferred for that reason. However, other means of heating the belts could be used, so long as temperature control consistent with the separation performance required from the melt separator can be maintained.

Melting of plastic particles to the desired degree for light adhesion to the belt is a function not only of belt temperature, but also of residence time of the particles on the belt, since melting of the plastic occurs as a result of transfer of heat energy to the particles from the heated belt. In the preferred embodiment of the invention, belts 801 through 805 are driven by motors 822 through 826, respectively, and the speed of each of motors 822 through 826 is independently controllable. The desired residence times for varying plastic materials will vary somewhat, based on variation in the heat transfer coefficient of the plastic materials, but the variation is sufficiently limited that differences in belt speeds do not create material throughput problems. It will be understood that belt temperatures and belt speeds can be determined by those of reasonable skill in the related arts, and that such determination must be made for each type of plastic to be treated.

Separated materials from the primary and secondary separation stages are routed to storage in silos, or other appropriate storage units, designated by reference numbers in the 900 series, for subsequent use or sale.

The foregoing description of the method of the invention and of apparatus of the invention is illustrative and not for purposes of limitation. The method steps and the apparatus are susceptible to a number of variations and alternative embodiments within the scope of the invention as claimed.

We claim:

1. A method of separating resource materials of preselected composition from a heterogenous mixture of materials, with the materials in such mixture in the form of dry, loose particles of uniform size and configuration, comprising the steps of introducing the heterogenous mixture of materials to a fluid flow separator assembly;

passing air through said fluid flow separator assembly in streams of predetermined flow rates and velocities so as to divide such mixture of materials into a stream of particles of highest density, a stream of particles of lowest density, and a stream of particles of intermediate density;

combining particles from said stream of particles of highest density and particles from said stream of particles of intermediate density into a first combined stream;

introducing said first combined stream into a second fluid flow separator assembly; and passing air through said second fluid flow separator assembly in streams of predetermined flow rates and velocities so as to divide said first combined stream into a second stream of particles of highest density, a second stream of particles of lowest density, and a second stream of particles of intermediate density.

2. The method of claim 1, including the additional steps of introducing said first stream of particles of lowest density to a third fluid flow separator assembly; and passing air through said third fluid flow separator assembly in streams of predetermined flow rates and velocities so as to divide such mixture of materials into a third stream of particles of highest density, a third stream of particles of lowest density, and a third stream of particles of intermediate density.

3. The method of claim 2, including the additional steps of combining particles from said third stream of particles of highest density and particles from said third stream of particles of intermediate density into a third combined stream;

introducing said third combined stream into a fourth fluid flow separator assembly; and passing air through said fourth fluid flow separator assembly in streams of predetermined flow rates and velocities so as to divide said first combined stream into a fourth stream of particles of highest density, a fourth stream of particles of lowest density, and a fourth stream of articles of intermediate density.

4. The method of claim 3, including the additional steps of introducing said third stream of particles of lowest density to a fifth fluid flow separator assembly; and passing air through said fifth fluid flow separator assembly in streams of predetermined flow rates and velocities so as to divide such mixture of materials into a fifth stream of particles of highest density, a fifth stream of particles of lowest density, and a fifth stream of particles of intermediate density.

5. The method of claim 4, including the additional steps of combining particles from said fifth stream of particles of highest density and particles from said fifth stream of particles of intermediate density into a fifth combined stream;

introducing said fifth combined stream into a sixth fluid flow separator assembly; and passing air through said sixth fluid flow separator assembly in streams of predetermined flow rates and velocities so as to divide said first combined stream into a sixth stream of particles of highest density, a sixth stream of particles of lowest density, and a sixth stream of particles of intermediate density.

6. The method of claim 5, including the additional steps of combining said second stream of particles of highest density and said second stream of particles of intermediate density into a second combined stream;

introducing said second combined stream, from said second fluid flow separator assembly, to a first secondary stage separator assembly; and dividing said second combined stream into a plurality of final particle streams each including particles having densities within a preselected discrete range.

7. The method of claim 6, including the additional steps of combining said fourth stream of particles of highest density and said fourth stream of particles of intermediate density into a fourth combined stream;

introducing said fourth combined stream, from said fourth fluid flow separator assembly, to a second secondary stage separator assembly; and dividing said fourth combined stream into a plurality of final particle streams each including particles having densities within a preselected discrete range.

8. The method of claim 7, including the additional steps of combining said sixth stream of particles of highest density and said sixth stream of particles of intermediate density into a sixth combined stream;

introducing said sixth combined stream, from said sixth fluid flow separator assembly, to a third secondary stage separator assembly; and dividing said sixth combined stream into a plurality of final particle streams each including particles having densities within a preselected discrete range.

9. The method of claim 6, wherein said step of dividing combined streams into a plurality of final particle streams includes the additional steps of placing the combined stream on an elongate conveyor having opposed edges, said conveyor being inclined across the width of the conveyor with one of said edges at a lower elevation than the opposite of said edges;

causing said conveyor to vibrate, thereby agitating the particles of material comprising the combined stream and causing said particles to move across the width of said conveyor at a rate of movement proportional to the density of said particles such that particles of higher density move across and fall from said conveyor before particles of lower density move across and fall from said conveyor; and collecting particles falling from said conveyor into discrete particle streams determined by the portion of the length of the conveyor from which such particles fall, each of said discrete particle streams including particles having densities within a preselected range.

10. The method of claim 1, wherein said fluid flow separator assembly includes a fluidized bed unit in which said air is passed through a bed of particles of material to be separated such that lower density particles are entrained in said air and removed from said bed, and wherein said particles remaining in said bed comprise said stream of particles of highest density.

11. The method of claim 10, wherein said fluid flow separator assembly further includes a cyclonic separator unit to receive said air and said particles entrained therein from said fluidized bed unit, in which said air is passed through said cyclonic separator unit such that particles therein comprising said stream of lowest density are entrained in said air and removed from said cyclonic separator unit thereby and such that particles therein comprising said stream of intermediated density drop from said air within said cyclonic separator unit.

12. The method of claim 5, wherein each of said fluid flow separator assemblies includes a fluidized bed unit and a cyclonic separator unit.

13. The method of claim 1, wherein said step of combining particles from said stream of particles of highest density and particles from said stream of particles of intermediate density into a first combined stream includes the additional steps of introducing said stream of particles of highest density and said stream of particles of intermediate density to a secondary stage separator assembly in a mixed particle stream; and dividing said mixed particle stream into a plurality of final particle streams, each including particles having densities within a preselected discrete range, and a first combined stream.

14. The method of claim 3, wherein said step of combining particles from said third stream of particles of highest density and particles from said third stream of particles of intermediate density into a third combined stream includes the additional steps of introducing said third stream of particles of highest density and said third stream of particles of intermediate density to a secondary stage separator assembly in a mixed third particle stream; and dividing said mixed third particle stream into a plurality of final particle streams, each including particles having densities within a preselected discrete range, and a third combined stream.

15. The method of claim 5, wherein said step of combining particles from said fifth stream of particles of highest density and particles from said fifth stream of particles of intermediate density into a fifth combined stream includes the additional steps of introducing said fifth stream of particles of highest density and said fifth stream of particles of intermediate density to a secondary stage separator assembly in a mixed fifth particle stream; and dividing said mixed fifth particle stream into a plurality of final particle streams, each including particles having densities within a preselected discrete range, and a fifth combined stream.

16. The method of claim 8, wherein one of said streams of particles includes a mixture of plastic materials with differing melting points, comprising the additional steps of placing said stream including said plastic materials on a first conveyor belt heated to a first temperature equal to the melting point of a first of said plastic materials to be separated thereby and allowing said first plastic material to partially melt and adhere to said first conveyor belt, dropping non-adhered materials from said first conveyor belt to a second conveyor belt, removing the adhered first plastic material from said first conveyor belt, and recovering said first plastic material for use or storage;

heating said second conveyor belt to a second temperature equal to the melting point of a second of said plastic materials to be separated thereby and allowing said second plastic material to partially melt and adhere to said second conveyor belt, dropping non-adhered materials from said second conveyor belt to a third conveyor belt, removing the adhered second plastic material from said second conveyor belt, and recovering said second plastic material for use or storage; and repeating the step of heating successive conveyor belts, partially melting and adhering a particular of said plastic materials to the respective conveyor belt, dropping non-adhered material, removing adhered plastic material, and recovering adhered plastic material, for each additional of said plastic materials to be separated.

* * * * *